United States Patent
Takase et al.

(10) Patent No.: US 10,015,401 B2
(45) Date of Patent: Jul. 3, 2018

(54) IMAGING MODULE, MANUFACTURING METHOD OF IMAGING MODULE, AND ELECTRONIC DEVICE

(71) Applicant: FUJIFILM Corporation, Tokyo (JP)

(72) Inventors: Yoshiyuki Takase, Saitama (JP); Kiyoto Sato, Saitama (JP); Tatsuya Fujinami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 35 days.

(21) Appl. No.: 15/205,779

(22) Filed: Jul. 8, 2016

(65) Prior Publication Data

US 2016/0323511 A1 Nov. 3, 2016

Related U.S. Application Data

(63) Continuation of application No. PCT/JP2014/081254, filed on Nov. 26, 2014.

(30) Foreign Application Priority Data

Jan. 9, 2014 (JP) .................................. 2014-002449

(51) Int. Cl.
| | |
|---|---|
| *H04N 5/232* | (2006.01) |
| *G03B 17/02* | (2006.01) |
| *H04N 5/225* | (2006.01) |
| *G01B 11/27* | (2006.01) |
| *G02B 7/04* | (2006.01) |

(Continued)

(52) U.S. Cl.
CPC ....... *H04N 5/23287* (2013.01); *G01B 11/272* (2013.01); *G02B 7/04* (2013.01);
(Continued)

(58) Field of Classification Search
CPC ............. H04N 5/23287; H04N 17/002; H04N 5/2254; H04N 5/23212; H04N 5/2252; H04N 5/2257; H04N 5/2253; G02B 7/08; G02B 27/646; G02B 7/04; G01B 11/272; G03B 17/02
See application file for complete search history.

(56) References Cited

U.S. PATENT DOCUMENTS

| | | | | |
|---|---|---|---|---|
| 2001/0055073 | A1* | 12/2001 | Shinomiya | H01L 27/14618 348/374 |
| 2009/0180021 | A1 | 7/2009 | Kikuchi et al. | |

(Continued)

FOREIGN PATENT DOCUMENTS

| | | |
|---|---|---|
| JP | 2008-241848 A | 10/2008 |
| JP | 2010-21985 A | 1/2010 |

(Continued)

*Primary Examiner* — Hung Lam
(74) *Attorney, Agent, or Firm* — Birch, Stewart, Kolasch & Birch, LLP

(57) ABSTRACT

An imaging module 100 includes a lens unit 10 which has a lens group 12, and an imaging element unit 20 which is fixed to the lens unit 10 and has an imaging element 27 which images a subject through the lens group 12. The lens unit 10 has a lens drive unit 16, and a flexible substrate 13A which includes a wiring group 13a which is electrically connected to the lens drive unit 16. The imaging element unit 20 has a wiring connection portion 24 which is electrically connected to the wiring group 13a included in the flexible substrate 13A. The flexible substrate 13A is folded in the middle of the flexible substrate 13A.

14 Claims, 14 Drawing Sheets

(51) Int. Cl.
G02B 27/64 (2006.01)
G02B 7/08 (2006.01)
H04N 17/00 (2006.01)

(52) U.S. Cl.
CPC ............ *G02B 7/08* (2013.01); *G02B 27/646* (2013.01); *G03B 17/02* (2013.01); *H04N 5/2252* (2013.01); *H04N 5/2253* (2013.01); *H04N 5/2254* (2013.01); *H04N 5/2257* (2013.01); *H04N 5/23212* (2013.01); *H04N 17/002* (2013.01)

(56) References Cited

U.S. PATENT DOCUMENTS

| | | | |
|---|---|---|---|
| 2010/0085474 A1 | 4/2010 | Morita | |
| 2011/0122267 A1* | 5/2011 | Ahn | G03B 5/00 348/208.7 |
| 2011/0286732 A1* | 11/2011 | Hosokawa | G03B 3/02 396/55 |
| 2012/0236167 A1* | 9/2012 | Takano | H05K 1/147 348/208.2 |
| 2015/0130974 A1* | 5/2015 | Chuang | H04N 5/2252 348/262 |
| 2015/0201127 A1* | 7/2015 | Ahn | G03B 5/02 348/208.99 |
| 2015/0229843 A1* | 8/2015 | Shimizu | G03B 5/00 348/222.1 |

FOREIGN PATENT DOCUMENTS

| | | |
|---|---|---|
| JP | 2010-88088 A | 4/2010 |
| JP | 2010-192749 A | 9/2010 |
| JP | 2013-85525 A | 5/2013 |
| JP | 2013-172390 A | 9/2013 |

* cited by examiner

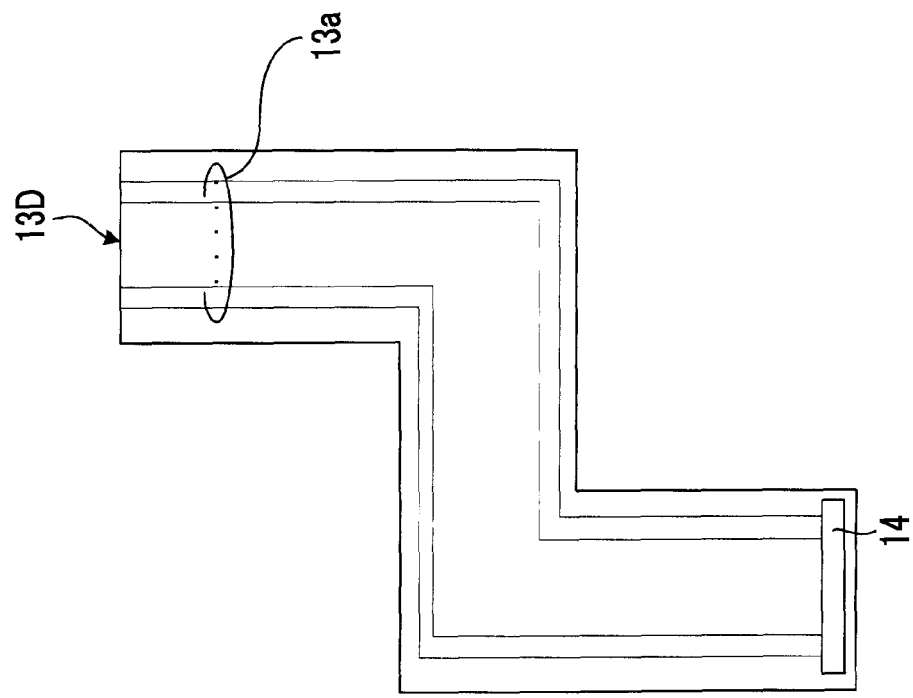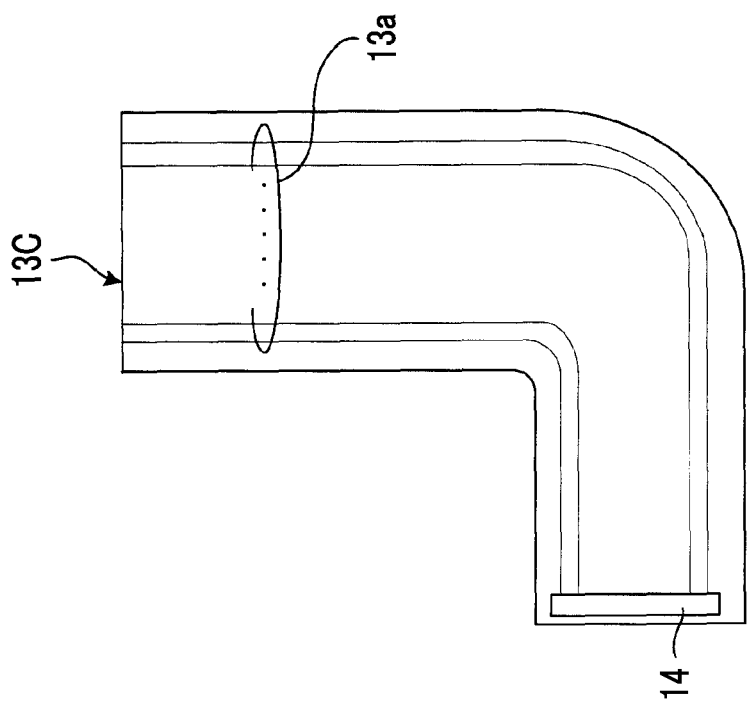
FIG. 14

IMAGING MODULE, MANUFACTURING METHOD OF IMAGING MODULE, AND ELECTRONIC DEVICE

CROSS REFERENCE TO RELATED APPLICATION

This is a continuation of International Application No. PCT/JP2014/081254 filed on Nov. 26, 2014, and claims priority from Japanese Patent Application No. 2014-002449 filed on Jan. 9, 2014, the entire disclosures of which are incorporated herein by reference.

BACKGROUND OF THE INVENTION

1. Field of the Invention

The present invention relates to an imaging module, a manufacturing method of an imaging module, and an electronic device.

2. Description of the Related Art

A small and thin imaging module is mounted on a portable electronic device such as a portable phone having an imaging function. The imaging module has a structure in which a lens unit, into which an imaging lens is incorporated, and an imaging element unit into which an imaging element such as a CCD image sensor or a CMOS image sensor is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A discloses the imaging module having the AF mechanism. In addition, JP2013-88525A and JP2008-241848A disclose the imaging module having the AF mechanism and the optical type image blur correction mechanism.

In recent years, in an imaging element which is used in an imaging module, not only imaging elements having a low pixel number such as approximately one million pixels to two million pixels but also imaging elements having a high pixel number such as three million pixels to ten million pixels or more are widely used.

In a case where the imaging element of a low pixel number is used, particularly, high accuracy is not required for positioning of the lens unit and the imaging element unit. However, in a case where the imaging element having a high pixel number is used, high accuracy is required for the positioning.

JP2010-21985A discloses a technology in which the lens unit and the imaging element unit are fixed to each other after the positioning of the lens unit and the imaging element unit is performed.

In JP2010-21985A, after the lens unit and the imaging element unit are set to an initial position, in a state where a probe comes into contact with the lens unit and electricity flows to the lens unit, a chart is imaged by the imaging element while the imaging element unit moves in a direction of an optical axis, and the positions of the lens unit and the imaging element unit are adjusted from the obtained captured image. After the adjustment, the lens unit and the imaging element unit are bonded and fixed to each other.

SUMMARY OF THE INVENTION

As described in JP2010-21985A, even though positioning of an imaging element unit and a lens unit is performed, due to manufacturing errors, processing and assembly errors, or the like of the lens unit or the imaging element unit, for example, a phenomenon in which blurs are different from each other for each region in an image occurs such as a case where a right end of a captured image is blurred and a left end thereof is focused.

If a pixel number of the imaging element is small, influences of the above-described phenomenon on the captured image quality can be neglected. However, in the recent years, since the size of the imaging module decreases and the pixel number of the imaging element increases, influences of the above-described phenomenon on the captured image quality cannot be neglected.

Accordingly, it is preferable to increase positioning accuracy of the imaging element unit and the lens unit. In order to increase the positioning accuracy, a process of relatively inclining the lens unit and the imaging element unit is required. Accordingly, as a substrate which connects the lens unit and the imaging element unit, a flexible substrate described in JP2013-88525A may be used.

However, as a camera module described in JP2013-88525A and JP2008-241848A, in a camera module having an AF mechanism and an optical type image blur correction mechanism, the number of terminals for allowing electricity to flow to the AF mechanism and the optical type image blur correction mechanism increases. Accordingly, stiffness of the flexible substrate, which connects the AF mechanism and the optical type image blur correction mechanism in the lens unit and the imaging element unit, increases.

If the stiffness of the flexible substrate increases, since a large force for adjusting relative inclination between the lens unit and the imaging element unit is required, there are concern that a cost of an imaging module manufacturing apparatus increases, the inclination angle cannot be increased, a force applied to the flexible substrate increases, and reliability of the substrate may decreases. In JP2013-88525A and JP2008-241848A, a problem occurring when the inclination adjustment is performed is not considered.

The present invention is made in consideration of the above-described circumstances, and an object thereof is to provide an inexpensive imaging module having high reliability capable of performing high-quality imaging.

According to an aspect of the present invention, there is provided an imaging module, comprising: a lens unit which has a lens group; and an imaging element unit which is fixed to the lens unit and has an imaging element which images a subject through the lens group, in which the lens unit has a lens drive unit which includes a first lens driving unit which move at least some of lenses of the lens group in a first direction along an optical axis of the lens group, and a second lens driving unit and a third lens driving unit which move at least some of the lenses of the lens group in a second direction and a third direction which are orthogonal to the optical axis of the lens group, respectively, and a wiring substrate which includes a wiring group electrically connected to the lens drive unit, the imaging element unit has a wiring connection portion which is electrically connected to the wiring group included in the wiring substrate, at least a portion of the wiring substrate which includes an end portion on a side connected to the wiring connection portion is configured of a flexible substrate, and when the wiring group is parallel with a plane, a shape of a portion of the flexible substrate in a plan view from a direction perpendicular to the plane is a bent shape or a curved shape.

According to another aspect of the present invention, there is provided a manufacturing method of the imaging module, the manufacturing method comprising: a first process of, on an axis orthogonal to a measurement chart, changing relative positions of the imaging element unit, the lens unit, and the measurement chart in the direction of the axis, and imaging the measurement chart by the imaging element at each relative position; and a second process of adjusting at least an inclination of the imaging element unit with respect to the lens unit based on imaging signals obtained by imaging the measurement chart using the imaging element, and fixing the imaging element unit to the lens unit, in which in the first process, the measurement chart is imaged by the imaging element at each relative position in a state where the wiring group of the wiring substrate is electrically connected to the wiring connection portion and electricity flows to the lens drive unit via the wiring connection portion.

According to still another aspect of the present invention, there is provided an electronic device comprising the imaging module.

According to the present invention, it is possible to provide an inexpensive imaging module having high reliability capable of performing high-quality imaging.

BRIEF DESCRIPTION OF THE DRAWINGS

FIG. 14 is a view showing a modification example of a portion of the flexible substrate 13B exposed from the housing 11 shown in FIGS. 13A and 13B.

EXPLANATION OF REFERENCES

Figure 1:
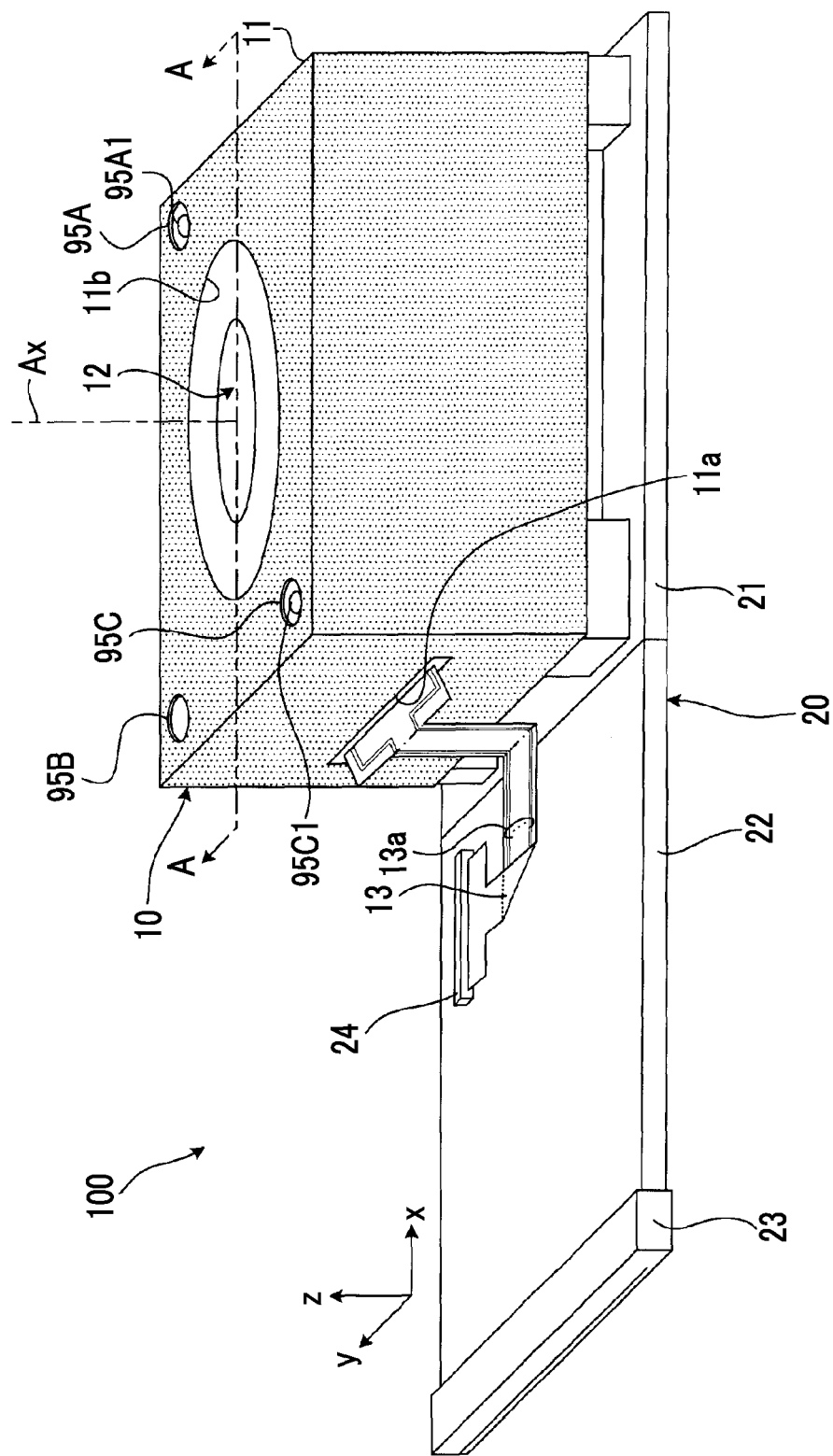
FIG. 1 is an external perspective view of an imaging module 100 according to an embodiment of the present invention.

100: imaging module
10: lens unit
12: lens group
13, 13A, 13B, 13D: flexible substrate
13a: wiring group
16: lens drive unit
20: imaging element unit
24: wiring connection portion

DESCRIPTION OF THE PREFERRED EMBODIMENTS

Hereinafter, embodiments of the present invention will be described with reference to the drawings.

FIG. 1 is an external perspective view of an imaging module 100 which is an embodiment of the present invention.

The imaging module 100 comprises a lens unit 10 which has a lens group 12, and an imaging element unit 20 which is fixed to the lens unit 10 and has an imaging element (not shown in FIG. 1) which images a subject through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 comprises a housing 11 in which components described below are accommodated. An opening 11a is provided on a side surface of the housing 11, and a portion of a flexible substrate 13 accommodated in the housing 11 is exposed from the opening 11a.

A lens unit terminal portion 14 (refer to FIGS. 4 and 5) including a plurality of terminals described below is provided on a distal end (an end portion opposite to the lens unit 10 side) of the exposed portion of the flexible substrate 13. The lens unit terminal portion 14 is electrically connected to a wiring connection portion 24 which is provided on the imaging element unit 20.

An opening 11b is provided on a top plate of the housing 11, and the lens group 12 is exposed from the opening 11b. The imaging module 100 receives light from the subject through the opening 11b and performs imaging.

Moreover, positioning concave sections 95A, 95B, and 95C for holding the lens unit 10 to a manufacturing apparatus when the imaging module 100 is manufactured are formed on the top plate of the housing 11. Concave sections 95A1 and 95C1 which are smaller than the concave sections 95A and 95C are formed on bottom surfaces of the concave sections 95A and 95C which are disposed on a diagonal line on the top plate.

Figure 2:
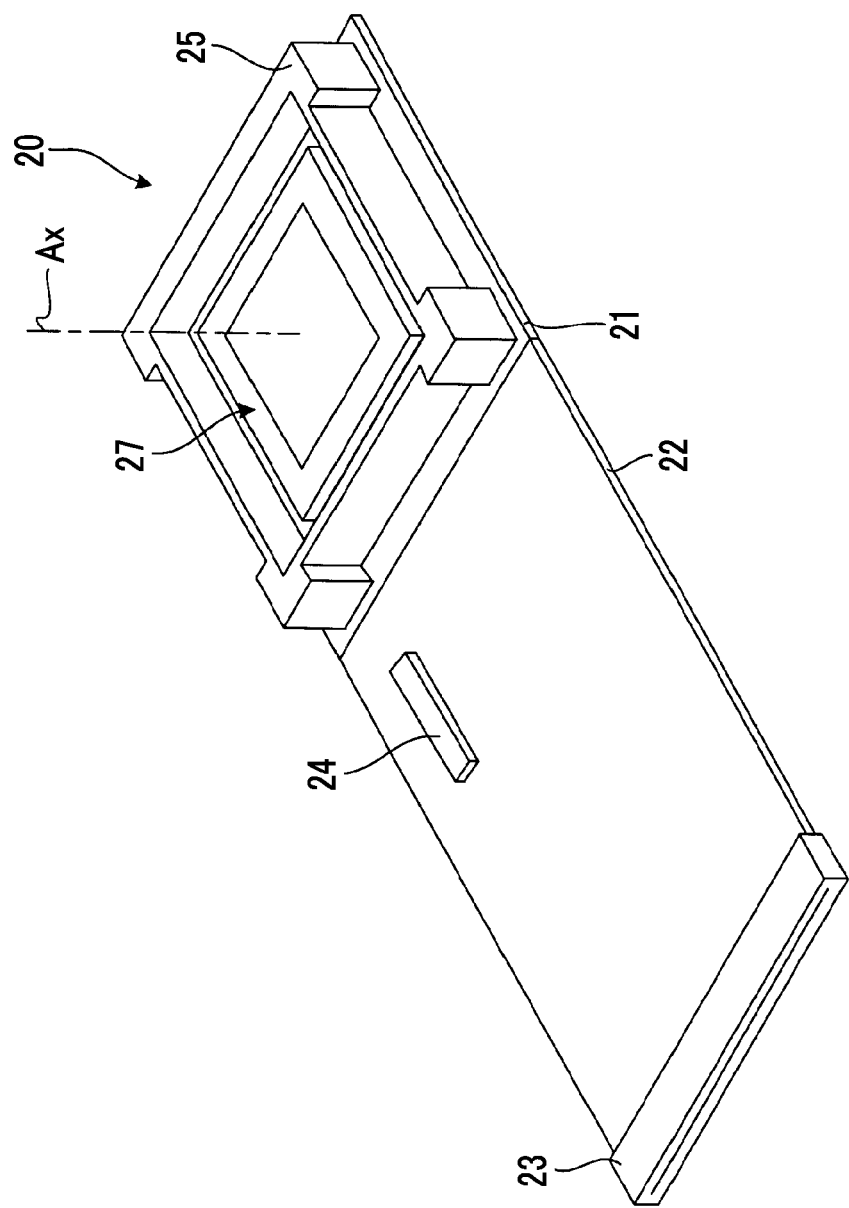
FIG. 2 is an external perspective view in a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 comprises a substrate 21 on which an imaging element 27 such as a CCD image sensor or a CMOS image sensor is formed, and a flexible substrate 22 which is electrically connected to the substrate 21.

A pixel pitch of the imaging element 27 is not particularly limited. However, an imaging element having a pixel pitch of 1.0 μm or less is used as the imaging element 27. Here, the pixel pitch means the minimum distance among distances between centers of photoelectrically converted regions included in pixels provided in the imaging element 27.

In recent years, the pixel pitch of the imaging element has decreased according to an increase of a pixel number. However, if the pixel pitch decreases, an area per one pixel decreases. Accordingly, a radius of an allowable circle of confusion decreases, and a focal depth decreases. In addition, since it is necessary to increase a condensed light amount per one pixel, an F-number of the lens is likely to be decreased.

Accordingly, in recent years, since the focal depth of the imaging module is very small, it is necessary to perform positioning of the lens unit and the imaging element unit with high accuracy. Particularly, if the pixel pitch is 1 μm or less, high positioning accuracy is required.

A tubular cover holder 25 is formed on the substrate 21, and the imaging element 27 is disposed inside the cover holder 25. A cover glass (not shown) is fitted to the upper portion of the imaging element 27 in a hollow portion of the cover holder 25.

A wiring connection portion 24 including terminals for electrically connecting with the flexible substrate 13 exposed from the housing 11 of the lens unit 10 is provided on the surface of the flexible substrate 22 on the outside of the cover holder 25.

Each terminal included in the wiring connection portion 24 is connected to an external connection terminal portion 23, which is provided on the end portion of the flexible substrate 22, via a wire provided on the flexible substrate 22. In order to electrically connect the flexible substrate 13 and the flexible substrate 22, for example, the wiring connection portion 24 is configured of a Board to Board (B to B) connector.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22.

Figure 3:
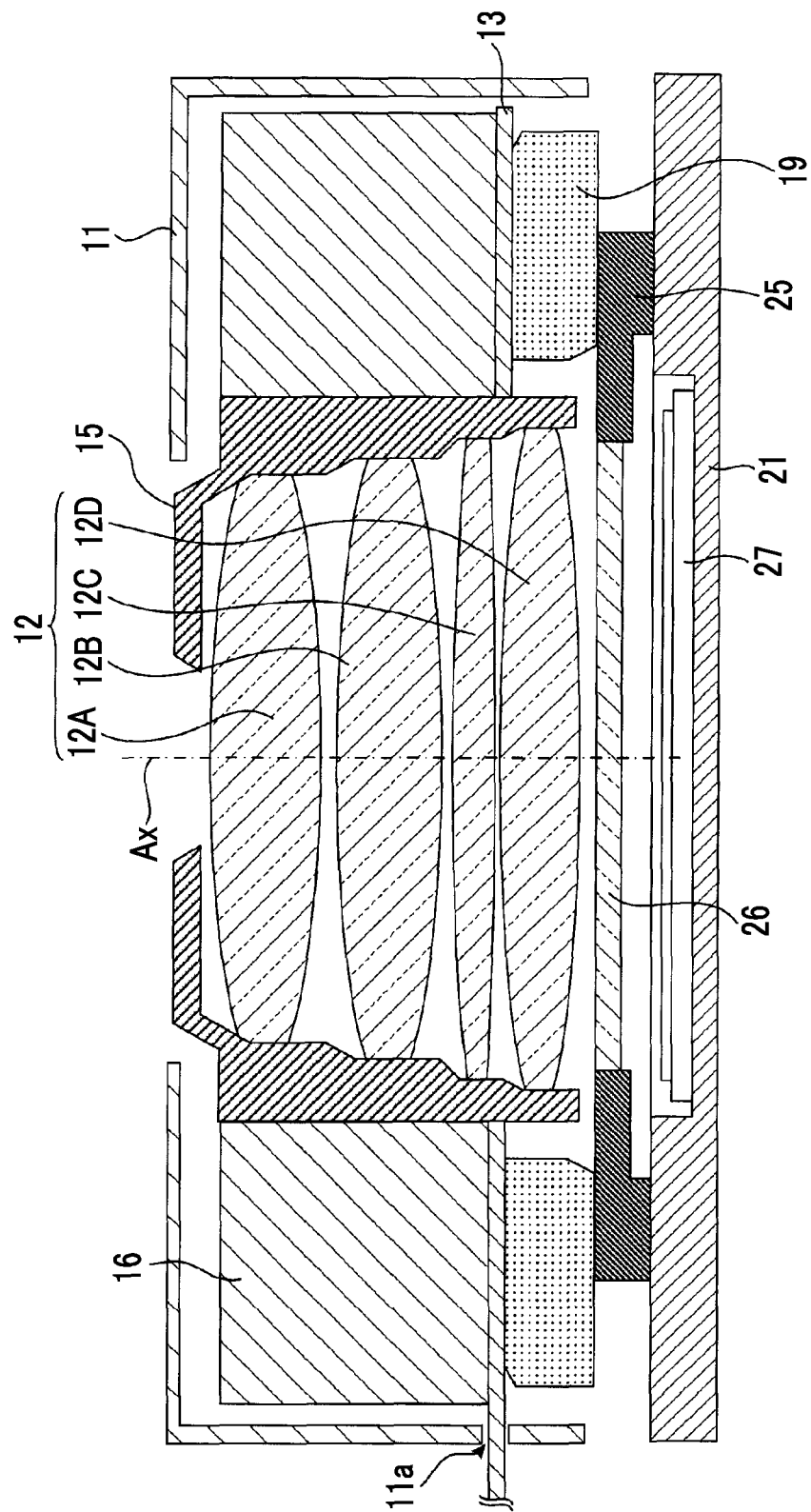
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

In addition, as shown in FIG. 3, the lens unit 10 comprises the lens group 12 which includes a plurality of lenses (four lenses 12A to 12D in the example of FIG. 3) disposed above the cover glass 26, a tubular lens barrel 15 which supports the lens group 12, a bottom block 19 which is placed on the upper surface of the cover holder 25 of the imaging element unit 20, the flexible substrate 13 which is fixed to the bottom block 19, and a lens drive unit 16 which is formed on the flexible substrate 13.

The lens group 12, the lens barrel 15, the bottom block 19, the flexible substrate 13, and the lens drive unit 16 are accommodated in the housing 11. A portion of the flexible substrate 13 is exposed to the outside of the housing 11 from the opening 11a provided on the side surface of the housing 11.

The lens drive unit 16 comprises a first lens driving unit, a second lens driving unit, a third lens driving unit, and a hall element which is a position detection element for detecting the position of the lens.

The first lens driving unit is a driving unit which moves at least a portion (all lenses of the lens group 12 in the example of FIG. 3) of the lenses of the lens group 12 in a first direction (z direction in FIG. 1) along the optical axis Ax of the lens group 12 so as to perform focus adjustment.

The second lens driving unit and the third lens driving unit are driving units which respectively move at least a portion (all lens of the lens group 12 in the example of FIG. 3) of the lens of the lens group 12 in a second direction (x direction in FIG. 1) and a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, a voice coil motor (VCM) is used. However, each lens driving unit may adopt known other means.

Figure 4:
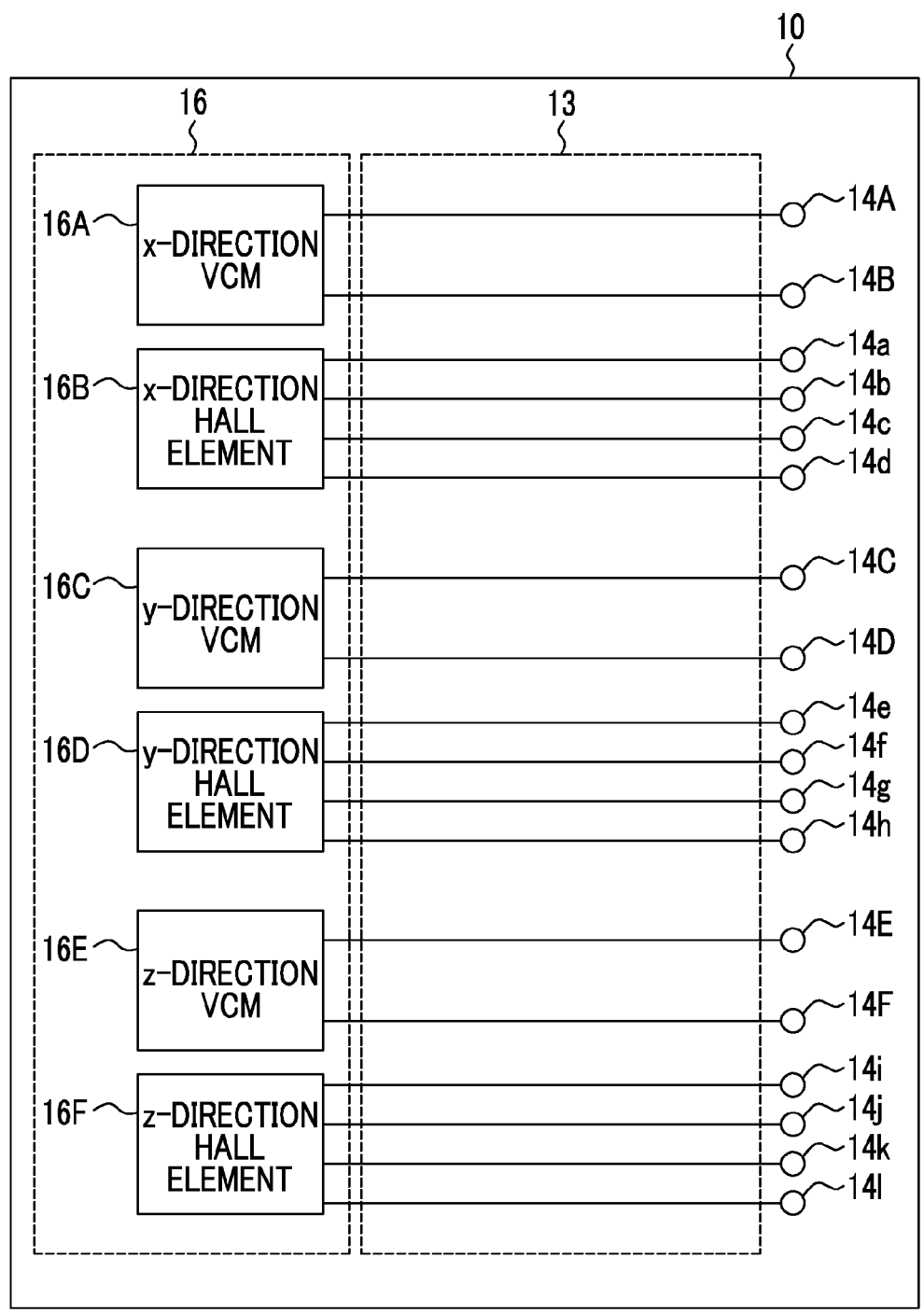
FIG. 4 is a view showing an electric connection configuration of the lens unit 10 shown in FIG. 1.

FIG. 4 is a block diagram showing an electric connection configuration of the lens unit 10 shown in FIG. 1.

As shown in FIG. 4, the lens drive unit 16 comprises an x-direction VCM 16A (the second lens driving unit) for moving the lens group 12 in the x direction, an x-direction hall element 16B for detecting a position of the lens group 12 in the x direction, a y-direction VCM 16C (the third lens driving unit) for moving the lens group 12 in the y direction, a y-direction hall element 16D for detecting a position of the lens group 12 in the y direction, a z-direction VCM 16E (the first lens driving unit) for moving the lens group 12 in the z direction, and a z-direction hall element 16F for detecting a position of the lens group 12 in the z direction.

Two terminals are formed on the x-direction VCM 16A, and the two terminals are electrically connected to a terminal 14A and a terminal 14B provided on the distal end of the flexible substrate 13 via wires formed on the flexible substrate 13, respectively.

Four terminals are formed on the x-direction hall element 16B, and the four terminals are electrically connected to a terminal 14a, a terminal 14b, a terminal 14c, and a terminal 14d provided on the distal end of the flexible substrate 13 via wires formed on the flexible substrate 13, respectively.

Two terminals are formed on the y-direction VCM 16C, and the two terminals are electrically connected to a terminal 14C and a terminal 14D provided on the distal end of the flexible substrate 13 via wires formed on the flexible substrate 13, respectively.

Four terminals are formed on the y-direction hall element 16D, and the four terminals are electrically connected to a terminal 14e, a terminal 14f, a terminal 14g, and a terminal 14h provided on the distal end of the flexible substrate 13 via wires formed on the flexible substrate 13, respectively.

Two terminals are formed on the z-direction VCM 16E, and the two terminals are electrically connected to a terminal 14E and a terminal 14F provided on the distal end of the flexible substrate 13 via wires formed on the flexible substrate 13, respectively.

Four terminals are formed on the z-direction hall element 16F, and the four terminals are electrically connected to a terminal 14i, a terminal 14j, a terminal 14k, and a terminal 14l provided on the distal end of the flexible substrate 13 via wires formed on the flexible substrate 13, respectively.

Figure 5:
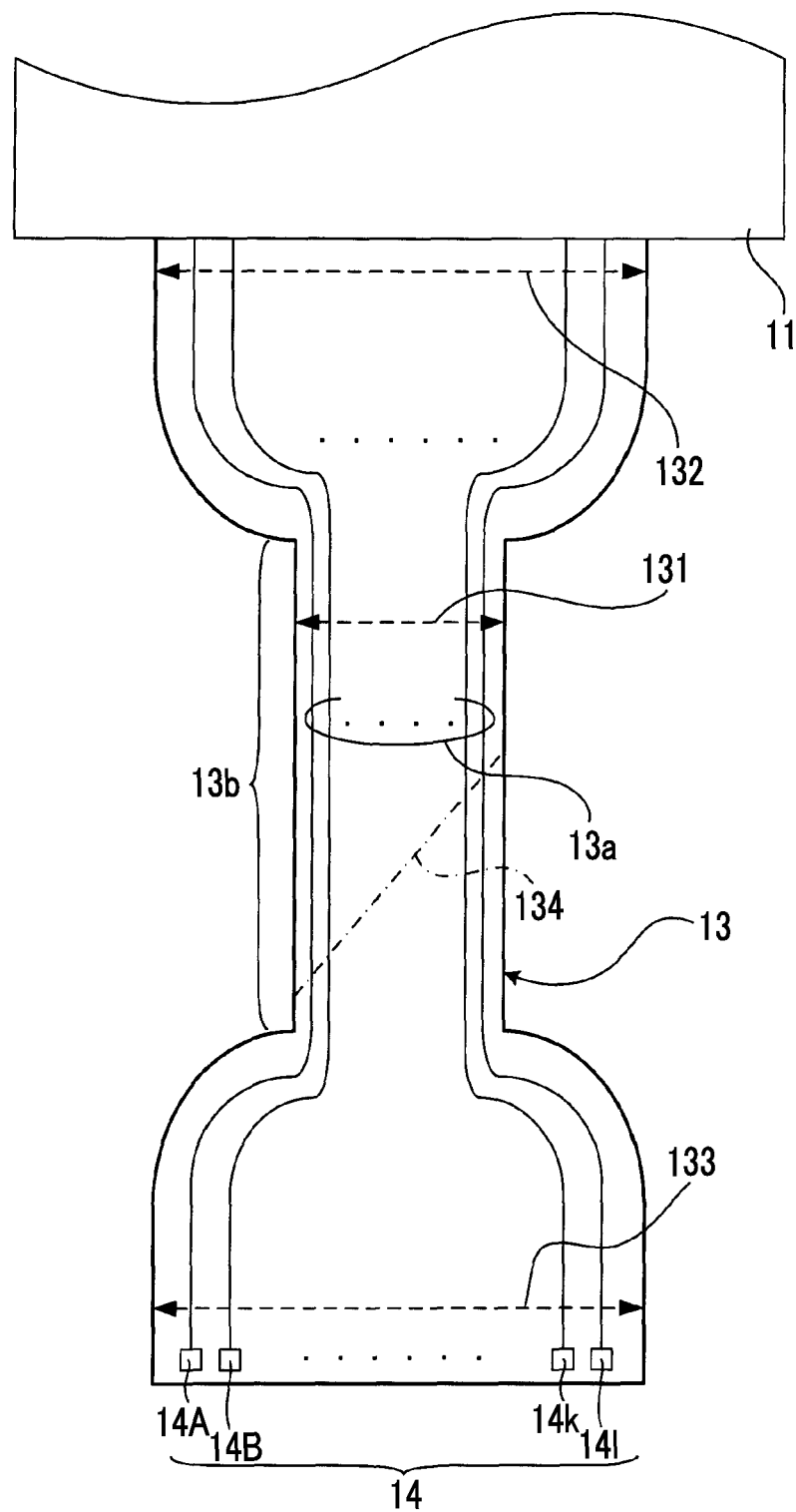
FIG. 5 is a plan view of a portion of a flexible substrate 13 exposed from a housing 11 shown in FIG. 1.

FIG. 5 is a plan view of the portion of the flexible substrate 13 exposed from the housing 11 shown in FIG. 1. The flexible substrate 13 is folded at a folding portion 134. However, in FIG. 5, the flexible substrate 13 is shown so as to be developed at the folding portion 134.

As shown in FIG. 5, the lens unit terminal portion 14 including the terminals 14A to 14F and 14a to 14l is provided on the end portion of the exposed portion of the flexible substrate 13 on the wiring connection portion 24 side. A wiring group 13a including wires connected to the terminals of the lens unit terminal portion 14 is provided inside the flexible substrate 13.

In this way, the flexible substrate 13 is a wiring substrate which includes the wiring group 13a which is electrically connected to the lens drive unit 16. The wiring connection portion 24 of the imaging element unit 20 includes terminals for electrically connecting with the terminals of the lens unit terminal portion 14 of the distal end of the flexible substrate 13.

In addition, as shown in FIG. 5, the exposed portion of the flexible substrate 13 has a portion 13b of which a width in an arrangement direction (right-left direction of FIG. 5) of the wires of the wiring group 13a is narrower than the width of an end portion on a side connected to the wiring connection portion 24.

Specifically, a size relationship among a width 133 of the end portion (distal end portion) of the exposed portion of the flexible substrate 13 on the side connected to the wiring connection portion 24, a width 132 of the end portion (proximal end portion) of the exposed portion of the flexible substrate 13 on the lens unit 10 side, and a width 131 of a portion (13b) between the distal end portion and the proximal end portion satisfies the width 133>the width 131<the width 132. In addition, the width 132 may be the same as the width 131.

When a length of the portion 13b having an narrow width of the flexible substrate 13 is defined as Lb and a length from the portion of the flexible substrate 13 protruding from the housing 11 of the lens unit 10 to the end surface on the lens unit terminal portion 14 side is defined as L, it is preferable to satisfy a range of 0.3<Lb/L<0.8. In addition, here, each of the lengths L and Lb is not a distance in a straight line at a reference position of each length but a length of the center of the width of the flexible substrate 13 along the shape of the flexible substrate 13.

By setting the length of the flexible substrate 13 to the range, when the position adjustment of the lens unit 10 and the imaging element unit 20 is performed, it is possible to decrease resistance due to stiffness of the flexible substrate 13 which inhibits the position adjustment. Accordingly, it is possible to prevent occurrence of disadvantages such as cutting of the flexible substrate 13.

The flexible substrate 13 is folded at the folding portion 134 which is provided in the portion 13b having a narrow width. As a result, the arrangement direction of the wiring group 13a in a portion of the flexible substrate 13 intersects the arrangement direction of the wiring group 13a of other portions except for the portion. In this way, when the wiring group 13a is parallel with a plane, a shape of a portion of the flexible substrate 13 in a plan view from a direction perpendicular to the plane is a bent shape or a curved shape.

In addition, the number of required terminals with respect to each lens driving unit and each hall element is an example, and is not limited to the above-described number. Moreover, the hall elements of the lens drive unit 16 may be omitted.

In the imaging module 100 configured as described above, first, the lens unit 10 and the imaging element unit 20 are separately manufactured. In addition, an adjustment process for positioning the lens unit 10 and the imaging element unit 20 is performed so that an image forming surface of the subject formed by the lens group 12 and an imaging surface of the imaging element 27 are coincident with each other, and thereafter, the lens unit 10 and the imaging element unit 20 are fixed to each other.

The adjustment process is performed by moving the imaging element unit 20 in a state where a predetermined state of the lens unit 10 is held by a manufacturing apparatus.

Figure 6:
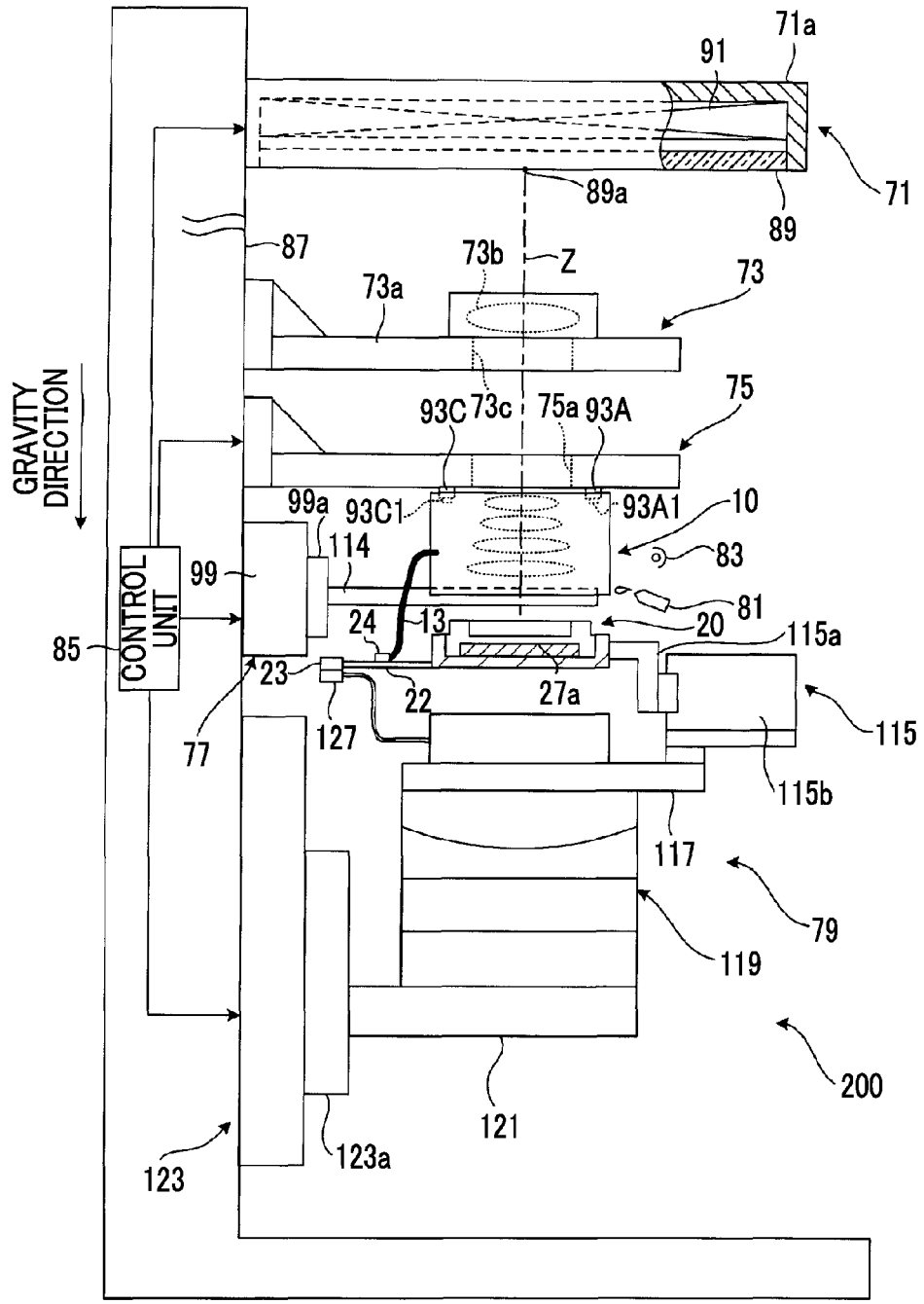
FIG. 6 is a side view showing a schematic configuration of an imaging module manufacturing apparatus 200 of the imaging module 100.

FIG. 6 is a side view showing a schematic configuration of the manufacturing apparatus 200 of the imaging module 100.

The imaging module manufacturing apparatus 200 adjusts the position and the inclination of the imaging element unit 20 with respect to the lens unit 10, and the imaging module 100 is completed by fixing the imaging element unit 20 to the lens unit 10 after the adjustment.

The imaging module manufacturing apparatus 200 comprises a chart unit 71, a collimator unit 73, a lens positioning plate 75, a lens holding mechanism 77, an imaging element unit holding portion 79, an adhesive supply portion 81, an ultraviolet lamp 83, and a control unit 85 which controls the above-described components. The components are disposed so as to be arranged in one direction on a surface of a workbench 87 parallel to the gravity direction.

The chart unit 71 is configured of a box-shaped housing 71a, a measurement chart 89 which is fitted into the housing 71a, and a light source 91 which is incorporated into the housing 71a and illuminates the measurement chart 89 from the rear surface of the measurement chart 89 with parallel light.

For example, the measurement chart 89 is formed of a plastic plate having light diffusibility. The chart surface of the measurement chart 89 is perpendicular to the gravity direction. The chart unit 71 functions as a measurement chart installation portion for installing the measurement chart 89. The measurement chart 89 can be removed so as to be replaced with another measurement chart.

Figure 7:
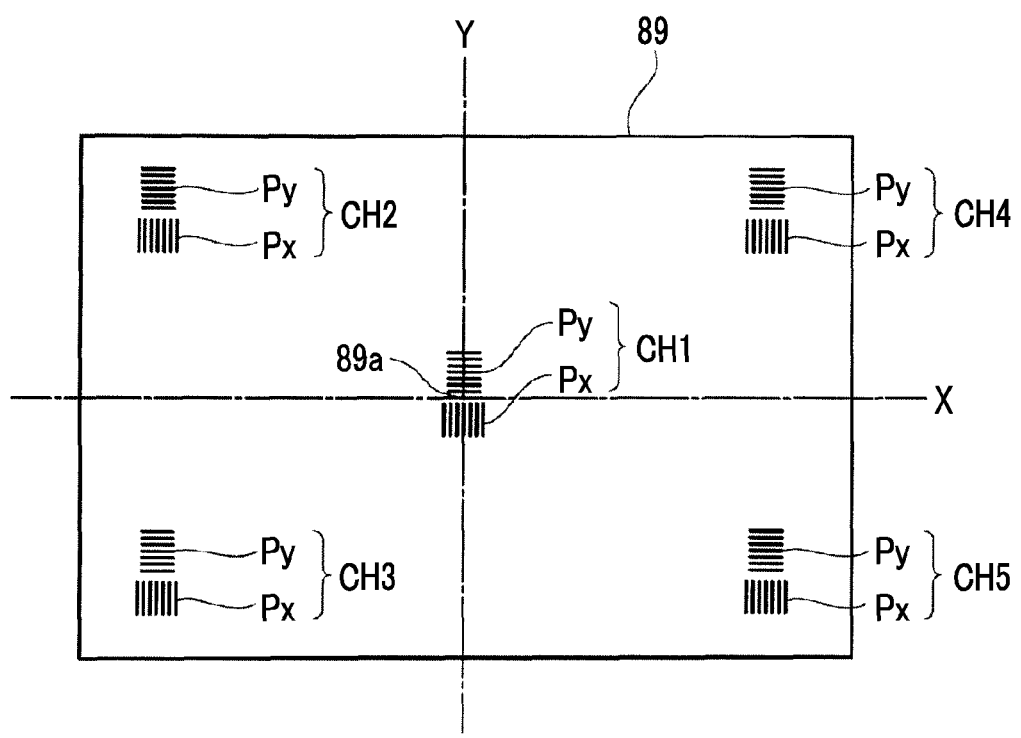
FIG. 7 is a view showing a chart surface of a measurement chart 89.

FIG. 7 is a view showing the chart surface of the measurement chart 89. The measurement chart 89 is formed in a rectangular shape, and each of a plurality of chart images CH1, CH2, CH3, CH4, and CH5 is printed on the chart surface on which chart patterns are provided.

The plurality of chart images are the same as one another, and are so-called ladder-shaped chart patterns in which black lines are disposed with predetermined intervals therebetween. Each chart image is configured of horizontal chart images Px arranged in a horizontal direction of the image, and vertical chart images Py arranged in a vertical direction of the image.

The collimator unit 73 is disposed to face the chart unit 71 on a Z axis which is a perpendicular line with respect to the chart surface of the measurement chart 89 and is a line passing through a chart surface center 89a.

The collimator unit 73 is configured of a bracket 73a which is fixed to the workbench 87 and a collimator lens 73b. The collimator lens 73b condenses the light radiated from the chart unit 71, and causes the condensed light to enter the lens unit 10 through an opening 73c formed on the bracket 73a.

For example, the lens positioning plate 75 is formed of metal so as to have stiffness, and has an opening 75a through which light condensed by the collimator unit 73 passes. The lens positioning plate 75 is disposed so as to face the collimator unit 73 on the Z axis.

Figure 8:
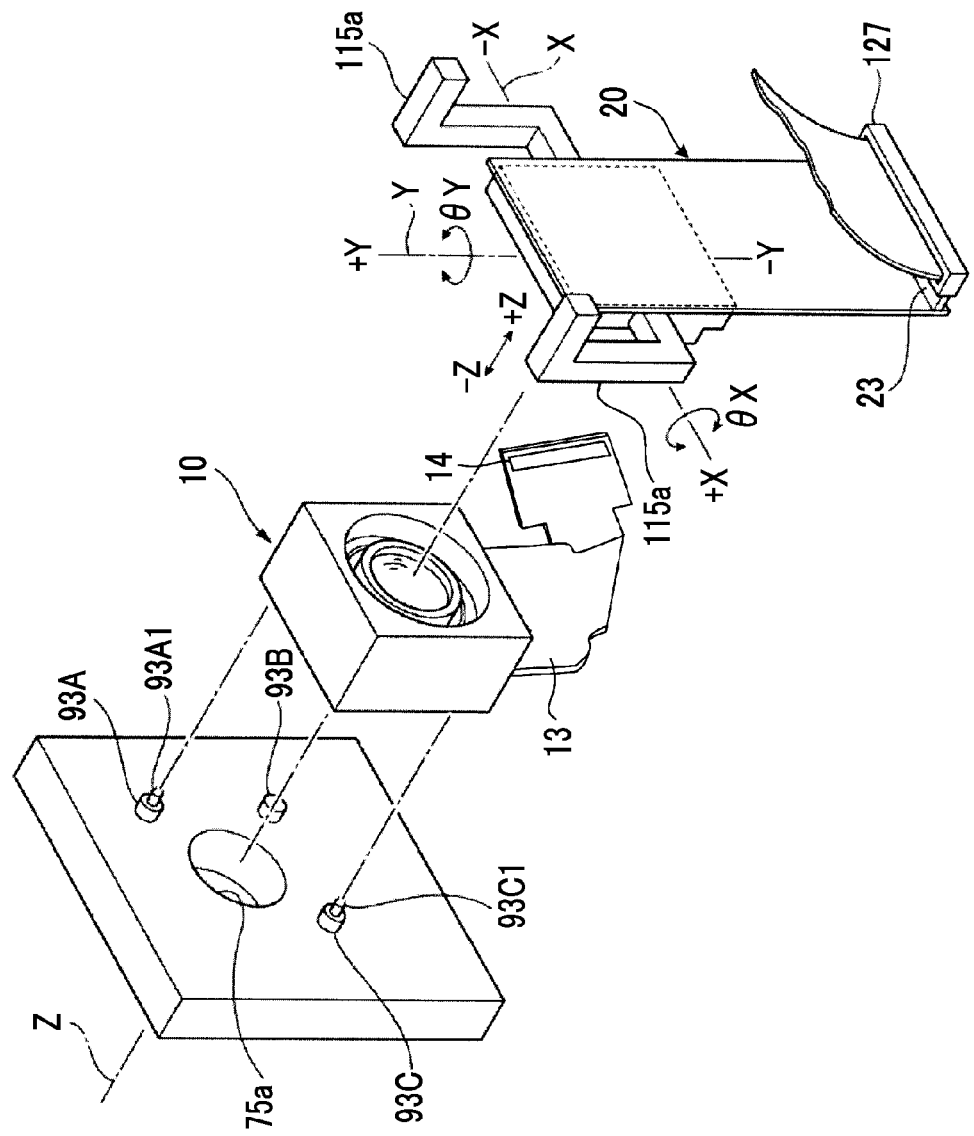
FIG. 8 is an explanatory view showing a state where the lens unit 10 and the imaging element unit 20 are held by the imaging module manufacturing apparatus 200.

FIG. 8 is an explanatory view showing a state where the lens unit 10 and the imaging element unit 20 are held by the imaging module manufacturing apparatus 200.

As shown in FIG. 8, three abutment pins 93A, 93B, and 93C are provided around an opening 75a on the surface of the lens positioning plate 75 on the lens holding mechanism 77 side.

Insertion pins 93A1 and 93C1 having smaller diameters than those of the abutment pins are provided on distal ends of two abutment pins 93A and 93C which are disposed on a diagonal line among the three abutment pins 93A, 93B, and 93C.

The abutment pins 93A, 93B, and 93C receive the concave sections 95A, 95B, and 95C of the lens unit 10 shown in FIG. 1, and the insertion pins 93A1 and 93C1 are inserted into the concave sections 95A1 and 95C1 to position the lens unit 10.

In this way, in a state where the lens unit 10 is positioned, the Z axis coincides with the optical axis Ax of the lens unit 10.

Returning to FIG. 6, the lens holding mechanism 77 comprises a first slide stage 99 which is movable in the Z axis direction, and a holding plate 114 which is provided on a stage portion 99a of the first slide stage 99.

The first slide stage 99 is an electric precision stage. In the first slide stage, a ball screw is rotated by rotation of a motor (not shown), and the stage portion 99a which engages with the ball screw moves in the Z axis direction. The first slide stage 99 is controlled by the control unit 85.

The holding plate 114 holds the lens unit 10 such that the top surface of the housing 11 faces the chart unit 71 on the Z axis. The lens unit 10 is held by the manufacturing apparatus 200 by moving the stage portion 99a in the Z axis direction and pressing the holding plate 114 to the bottom block 19 of the lens unit 10 which is positioned by the lens positioning plate 75.

In this way, the lens positioning plate 75 and the lens holding mechanism 77 configure a lens unit holding portion which holds the lens unit 10 on the Z axis.

The imaging element unit holding portion 79 holds the imaging element unit 20 on the Z axis. In addition, the imaging element unit holding portion 79 can change the position and the inclination of the imaging element unit 20 in the Z axis direction by the control of the control unit 85.

Here, the inclination of the imaging element unit 20 means the inclination of the imaging surface 27a of the imaging element 27 with respect to a plane orthogonal to the Z axis.

The imaging element unit holding portion 79 is configured of a chuck hand 115 which holds the imaging element unit 20 so that the imaging surface 27a faces the chart unit 71 on the Z axis, a biaxial rotation stage 119 which holds an approximately crank-shaped bracket 117 to which the chuck hand 115 is attached, and adjusts the inclination of the imaging element unit 20 around two axes (horizontal X axis and vertical Y axis) orthogonal to the Z axis, and a second slide stage 123 which holds a bracket 121 to which the biaxial rotation stage 119 is attached, and moves the bracket 121 in the Z axis direction.

As shown in FIG. 8, the chuck hand 115 is configured of a pair of holding members 115a which is bent in an approximately crank shape, and an actuator 115b (refer to FIG. 6) which moves the holding members 115a in the X axis direction orthogonal to the Z axis. An outer frame of the imaging element unit 20 in inserted into the portion between the holding members 115a to hold the imaging element unit 20.

In addition, the chuck hand 115 positions the imaging element unit 20 which is held between the holding members 115a so that the optical axis Ax of the disposed lens unit 10 and the center position of the imaging surface 27a are approximately coincident with each other.

The biaxial rotation stage 119 is an electric twin-axis gonio stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage, a ball screw is rotated by rotation of a motor (not shown), and a stage portion 123a which engages with the ball screw moves in the Z axis direction. The bracket 121 is fixed to the stage portion 123a.

A connector cable 127, which is connected to the external connection terminal portion 23 provided on the distal end of the flexible substrate 22 of the imaging element unit 20, is attached to the biaxial rotation stage 119. Drive signals of the imaging element 27 are input to the connector cable 127, drive signals are input to the lens drive unit 16 through the connector cable 127, signals of the hall element of the lens drive unit 16 are output through the connector cable 127, or imaging signals output from the imaging element 27 are output through the connector cable 127.

The adhesive supply portion 81 and the ultraviolet lamp 83 configure a unit fixing portion which fixes the lens unit 10 and the imaging element unit 20.

After the adjustment with respect to the position and the inclination of the imaging element unit 20 with respect to the lens unit 10 ends, the adhesive supply portion 81 supplies a ultraviolet curing type adhesive to a gap between the lens unit 10 and the imaging element unit 20.

The ultraviolet lamp 83 irradiates the ultraviolet curing type adhesive supplied to the gap with ultraviolet rays, and the adhesive is cured. Moreover, as the adhesive, in addition to the ultraviolet curing type adhesive, an instantaneous adhesive, a thermosetting adhesive, a natural curing adhesive, or the like may be used.

Figure 9:
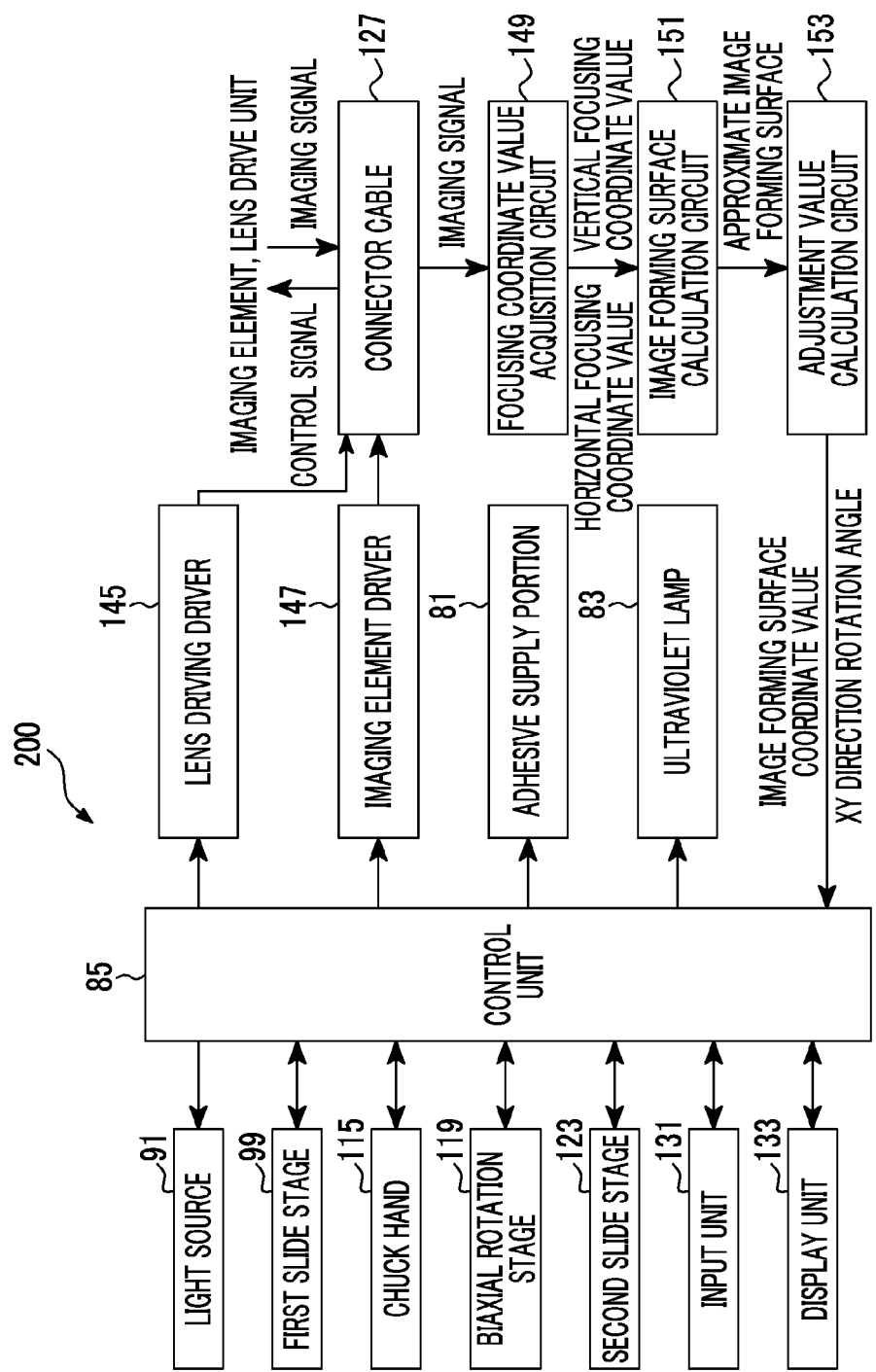
FIG. 9 is a block diagram showing an internal configuration of the imaging module manufacturing apparatus 200.

FIG. 9 is a block diagram showing an internal configuration of the imaging module manufacturing apparatus 200.

As shown in FIG. 9, the above-described portions are connected to the control unit 85. For example, the control unit 85 is a microcomputer which comprises a CPU, a ROM, a RAM, or the like, and controls each portion based on a control program stored in the ROM. In addition, an input unit 131 such as a keyboard or a mouse for performing various setting and a display unit 133 on which a setting content, an operation content, operation results, or the like is displayed are connected to the control unit 85.

A lens driving driver 145 is a drive circuit for driving the lens drive unit 16 including the first lens driving unit, the second lens driving unit, and the third lens driving unit, and supplies drive signals to the lens drive unit 16 via the connector cable 127 and the wiring connection portion 24.

A focusing coordinate value acquisition circuit 149 acquires focusing coordinate values at a high focusing degree in the Z axis direction with respect to a plurality of imaging positions (positions corresponding to chart images CH1, CH2, CH3, CH4, and CH5 of the measurement chart 89) which are set on the imaging surface 27a of the imaging element 27.

When the focusing coordinate values at the plurality of imaging positions are acquired, the control unit 85 controls the second slide stage 123 and sequentially moves the imaging element unit 20 to a plurality of measurement positions (Z0, Z1, Z2, . . . ) which are discretely set on the Z axis in advance. In addition, the control unit 85 controls an imaging element driver 147, and images each chart image of the plurality of chart images CH1, CH2, CH3, CH4, and CH5 of the measurement chart 89, which are formed by the lens group 12 at the measurement positions, on the imaging element 27.

The focusing coordinate value acquisition circuit 149 extracts signals of the pixels corresponding to the plurality of imaging positions from imaging signals input via the connector cable 127, and calculates an individual focusing evaluation value with respect to the plurality of imaging positions from the pixel signals. In addition, the measurement position when a predetermined focusing evaluation value is obtained with respect to each imaging position is set to the focusing coordinate value on the Z axis.

For example, as the focusing evaluation value, a Contrast Transfer Function (hereinafter, referred to as a CTF value) may be used. The CTF value is a value which indicates contrast of an image with respect to spatial frequency, and it is regarded that the focusing degree increases as the CTF value increases.

The focusing coordinate value acquisition circuit 149 calculates the CTF value in each of the plurality of directions set on an XY coordinate plane for each of the plurality of measurement positions (Z0, Z1, Z2, . . . ) set on the Z axis with respect to each of the plurality of imaging positions. For example, as the direction in which the CTF value is calculated, a lateral direction of the imaging surface 27a is set to the horizontal direction (X axis direction), a direction orthogonal to the horizontal direction is set to a vertical direction (Y axis direction), and an X-CTF value and a Y-CTF value which are the CTF values in the directions are calculated.

As a horizontal focusing coordinate value, the focusing coordinate value acquisition circuit 149 acquires coordinates (Zp1, Zp2, Zp3, Zp4, and Zp5) on the Z axis of the measurement position, at which the X-CTF value is the maximum, with respect to the plurality of imaging positions corresponding to the chart images CH1, CH2, CH3, CH4, and CH5. In addition, similarly, as a vertical focusing coordinate value, the focusing coordinate value acquisition circuit 149 acquires the coordinates on the Z axis at the measurement position at which the Y-CTF value is the maximum.

The horizontal focusing coordinate value and the vertical focusing coordinate value of each imaging position acquired from the focusing coordinate value acquisition circuit 149 are input to an image forming surface calculation circuit 151. The image forming surface calculation circuit 151 deploys a plurality of evaluation points, which are expressed by combining an XY coordinate value of each imaging position when the imaging surface 27a corresponds to an XY coordinate plane and the horizontal focusing coordinate value and the vertical focusing coordinate value on the Z axis obtained for each imaging position, on a three-dimensional coordinate system in which the XY coordinate plane and the Z axis are combined. In addition, the image forming surface calculation circuit 151 calculates an approximate image forming surface, in which the three-dimensional coordinate system is expressed by one plane, based on relative positions of the evaluation points.

Information of the approximate image forming surface obtained from the image forming surface calculation circuit 151 is input to an adjustment value calculation circuit 153. The adjustment value calculation circuit 153 calculates an image forming surface coordinate value F1 on the Z axis which is an intersection point between the approximate image forming surface and the Z axis, and XY direction rotation angles which are inclinations of the approximate image forming surface with respect to the XY coordinate plane around the X axis and the Y axis, and inputs the calculated values to the control unit 85.

The control unit 85 drives the imaging element unit holding portion 79 based on the image forming surface coordinate value and the XY direction rotation angles input from the adjustment value calculation circuit 153, adjusts the Z axis direction position and the inclination of the imaging element unit 20, and causes the imaging surface 27a to coincide with the approximate image forming surface.

The above-described imaging module manufacturing apparatus 200 schematically performs the following processes.

(1) A process of holding the lens unit 10 and the imaging element unit 20 on the Z axis orthogonal to the chart surface of the measurement chart 89.

(2) A process of changing the Z axis direction position of the imaging element unit 20 held on the Z axis, driving the imaging element 27 in a state where electricity flows to the lens drive unit 16 of the lens unit 10 held on the Z axis, via the wiring connection portion 24, and imaging the measurement chart 89 by the imaging element 27 at each position.

(3) A process of adjusting the position and the inclination of the imaging element unit 20 with respect to the lens unit 10 based on the imaging signals obtained by imaging the measurement chart 89 using the imaging element 27, and fixing the imaging element unit 20 to the lens unit 10.

Hereinafter, details of the manufacturing process of the imaging module 100 performed by the imaging module manufacturing apparatus 200 will be described with reference to a flowchart of FIG. 10.

First, holding (S1) of the lens unit 10 performed by the lens holding mechanism 77 will be described.

First, the control unit 85 controls the first slide stage 99 so as to move the holding plate 114 along the Z axis direction, and forms a space in which the lens unit 10 can be inserted into a portion between the lens positioning plate 75 and the holding plate 114. The lens unit 10 is held by a robot (not shown) and is transferred to the portion between the lens positioning plate 75 and the holding plate 114.

The control unit 85 detects the movement of the lens unit 10 using an optical sensor or the like, and moves the stage portion 99a of the first slide stage 99 in the direction approaching the lens positioning plate 75. Accordingly, the holding plate 114 moves toward the lens positioning plate 75. In addition, the concave sections 95A, 95B, and 95C of the lens unit 10 come into contact with the abutment pins 93A, 93B, and 93C, and the insertion pins 93A1 and 93C1 are inserted into the concave sections 95A1 and 95C1. Accordingly, the lens unit 10 is maintained in a state of being positioned in the Z axis direction, the X axis direction, and the Y axis direction. If the holding of the lens unit 10 is completed, the holding of the lens unit 10 is released by a robot (not shown).

Next, holding (S2) of the imaging element unit 20 performed by the imaging element unit holding portion 79 will be described.

The control unit 85 controls the second slide stage 123 so as to move the biaxial rotation stage 119 along the Z axis direction, and forms a space in which the imaging element unit 20 can be inserted into a portion between the holding plate 114 and the biaxial rotation stage 119. The imaging element unit 20 is held by a robot (not shown) and is transferred to the portion between the holding plate 114 and the biaxial rotation stage 119.

The control unit 85 detects the movement of the imaging element unit 20 using an optical sensor or the like, and moves the stage portion 123a of the second slide stage 123 in the direction approaching the holding plate 114. In addition, a worker holds the imaging element unit 20 using the holding member 115a of the chuck hand 115. In addition, the connector cable 127 is connected to the external connection terminal portion 23 of the imaging element unit 20. Accordingly, the imaging element 27 and the control unit 85 are electrically connected to each other. Thereafter, the holding of the imaging element unit 20 is released by a robot (not shown).

In this way, after the lens unit 10 and the imaging element unit 20 are held on the Z axis, a worker connects the distal end portion of the flexible substrate 13 exposed from the housing 11 of the lens unit 10 to the wiring connection portion 24 (S3). Accordingly, the lens drive unit 16 of the lens unit 10 and the control unit 85 of the manufacturing apparatus 200 are electrically connected to each other.

Next, the horizontal focusing coordinate value and the vertical focusing coordinate value of each imaging position of the imaging surface 27a are acquired by the focusing coordinate value acquisition circuit 149 (S4).

Specifically, the control unit 85 controls the second slide stage 123 so as to move the biaxial rotation stage 119 in the direction approaching the lens holding mechanism 77, and moves the imaging element unit 20 to an initial measurement position at which the imaging element 27 is closest to the lens unit 10.

The control unit 85 causes the light source 91 of the chart unit 71 to emit light. In addition, the control unit 85 inputs the driving signals from the lens driving driver 145 to the lens drive unit 16, and holds the x direction position, the y direction position, and the z direction position of the optical axis Ax of the lens group 12 to a reference position (for example, initial position when actually used).

Next, the control unit 85 controls the imaging element driver 147 so as to image the chart images CH1, CH2, CH3, CH4, and CH5 formed by the lens unit 10 on the imaging element 27. The imaging element 27 inputs the captured imaging signals to the focusing coordinate value acquisition circuit 149 via the connector cable 127.

The focusing coordinate value acquisition circuit 149 extracts the signals of the pixel at the imaging position corresponding to each of the chart images CH1, CH2, CH3, CH4, and CH5 from the input imaging signals, and calculates the X-CTF value and the Y-CTF value with respect to each imaging position from the pixel signals. For example, the control unit 85 stores the information of the X-CTF value and the Y-CTF value in the RAM in the control unit 85.

The control unit 85 sequentially moves the imaging element unit 20 to the plurality of measurement positions (Z0, Z1, Z2, . . . ) set along the Z axis direction, and images the chart image of the measurement chart 89 using the imaging element 27 at each measurement position in the state where the lens group 12 is held at the reference position. The focusing coordinate value acquisition circuit 149 calculates the X-CTF value and the Y-CTF value at the imaging position of each measurement position.

The focusing coordinate value acquisition circuit 149 selects the maximum value among the plurality of calculated X-CTF values and Y-CTF values with respect to each imaging position, and acquires the Z axis coordinate of the measurement position, at which the maximum value is obtained, as the horizontal focusing coordinate value and the vertical focusing coordinate value at the imaging position.

The horizontal focusing coordinate value and the vertical focusing coordinate value acquired by the focusing coordinate value acquisition circuit 149 are input to the image forming surface calculation circuit 151. For example, the image forming surface calculation circuit 151 calculates an approximately planarized approximate image forming surface F using a least square method (S6).

The information of the approximate image forming surface F calculated by the image forming surface calculation circuit 151 is input to the adjustment value calculation circuit 153. The adjustment value calculation circuit 153 calculates the image forming surface coordinate value F1 which is the intersection point between the approximate image forming surface F and the Z axis, and the XY direction rotation angles which are the inclinations of the approximate image forming surface with respect to the XY coordinate plane around the X axis and the Y axis, and inputs the calculated value and angles to the control unit 85 (S7).

The control unit 85 controls the biaxial rotation stage 119 and the second slide stage 123 based on the image forming surface coordinate value F1 and the XY direction rotation angles, and moves the imaging element unit 20 in the Z axis direction such that the center position of the imaging surface 27a of the imaging element 27 is coincident with the image forming surface coordinate value F1. In addition, angles of the imaging element unit 20 in the θx direction and the θy direction are adjusted such that the inclination of the imaging surface 27a is coincident with the approximate image forming surface F (S8).

The control unit 85 performs a confirmation process which confirms the focusing position of each imaging position after the position and the inclination of the imaging element unit 20 are adjusted (S9). In this confirmation process, the processes of the above-described S4 and S6 are performed again. After the position and the inclination of the imaging element unit 20 are adjusted, variation of evaluation values corresponding to the horizontal direction and the vertical direction with respect to each of the imaging positions decreases.

After the confirmation process (S9) ends (S5: YES), the control unit 85 moves the imaging element unit 20 in the Z axis direction such that the center position of the imaging surface 27a is coincident with the image forming surface coordinate value F1 (S10). In addition, the control unit 85 supplies the ultraviolet curing adhesive from the adhesive supply portion 81 to the gap between the lens unit 10 and the imaging element unit 20 (S11), and cures the ultraviolet curing type adhesive by lighting the ultraviolet lamp 83 (S12). Moreover, the confirmation process of S9 may be omitted, and the step may proceed to S10 after S8.

After the adhesive is cured and the lens unit 10 and the imaging element unit 20 are fixed to each other, the completed imaging module 100 is discharged from the imaging module manufacturing apparatus 200 by a robot (not shown) (S13).

In addition, the lens unit 10 and the imaging element unit 20 are fixed by the ultraviolet curing type adhesive. However, the curing of the ultraviolet curing type adhesive may be used for temporary fixation between the lens unit 10 and the imaging element unit 20.

For example, in a state where the lens unit 10 and the imaging element unit 20 are temporarily fixed to each other, the imaging module 100 is discharged from the imaging module manufacturing apparatus 200, a desired process such as cleaning processing is performed, and thereafter, the lens unit 10 and the imaging element unit 20 may be completely fixed to each other by a thermosetting type adhesive or the like.

By manufacturing the imaging module 100 using the above-described manufacturing apparatus 200, it is possible to perform positioning of the lens unit 10 and the imaging element unit 20 with high accuracy.

In the present embodiment, since the positioning of the lens unit 10 and the imaging element unit 20 is performed with high accuracy, electricity flows to the lens drive unit 16 inside the lens unit 10 to control the position of the lens group 12. In addition, the electric connection between the lens drive unit 16 and the control unit 85 is performed via the wiring connection portion 24 of the imaging element unit 20.

That is, when the inclination of the imaging element unit 20 with respect to the lens unit 10 is adjusted, the distal end portion of the flexible substrate 13 of the lens unit 10 is fixed to the imaging element unit 20. Accordingly, if stiffness of the flexible substrate 13 increases, it is difficult to incline the imaging element unit 20.

As shown in FIG. 5, the flexible substrate 13 of the lens unit 10 has the portion 13*b* having a narrow width in the arrangement direction of wires of the wiring group 13*a*. In the distal end portion of the flexible substrate 13, it is necessary to arrange the terminals of the lens unit terminal portion 14 with predetermined intervals therebetween. Accordingly, it is not possible to decrease the width of the distal end portion.

Meanwhile, in the flexible substrate 13, since it is possible to dispose the wires of the wiring group 13*a* so as to be filled with the wires in the portions except for the distal end portion, it is possible to decrease the width. In this way, since there is the portion having a narrower width than that of the distal end portion in the flexible substrate 13, unlike a flexible substrate (for example, a flexible substrate having a constant width) in which there is no portion having a narrow width, resistance with respect to bending decreases. In addition, since the flexible substrate 13 is folded in the middle of the flexible substrate 13, there is a room in the movement of the flexible substrate 13, and resistance with respect to bending decreases.

Accordingly, it is possible to change the inclination of the imaging element unit 20 by a small force, and it is possible to prevent the cost of the manufacturing apparatus 200 from increasing. Moreover, since the resistance with respect to the bending decreases, it is possible to prevent the flexible substrate 13 from being damaged, and it is possible to improve reliability of the imaging module.

Since the above-described effects can be obtained by simply changing the shape of the flexible substrate 13, it is possible to inexpensively manufacture an imaging module having high reliability without largely increasing the manufacturing cost of the imaging module.

Moreover, the position at which the folding portion 134 is provided in the flexible substrate 13 is not limited to the portion having a narrow width of the flexible substrate 13, and the folding portion 134 may be provided in portions except for the portion having a narrow width. As shown in FIG. 1, the folding is formed in the portion having a narrow width, and it is possible to further decrease the resistance with respect to the bending.

Figure 11:
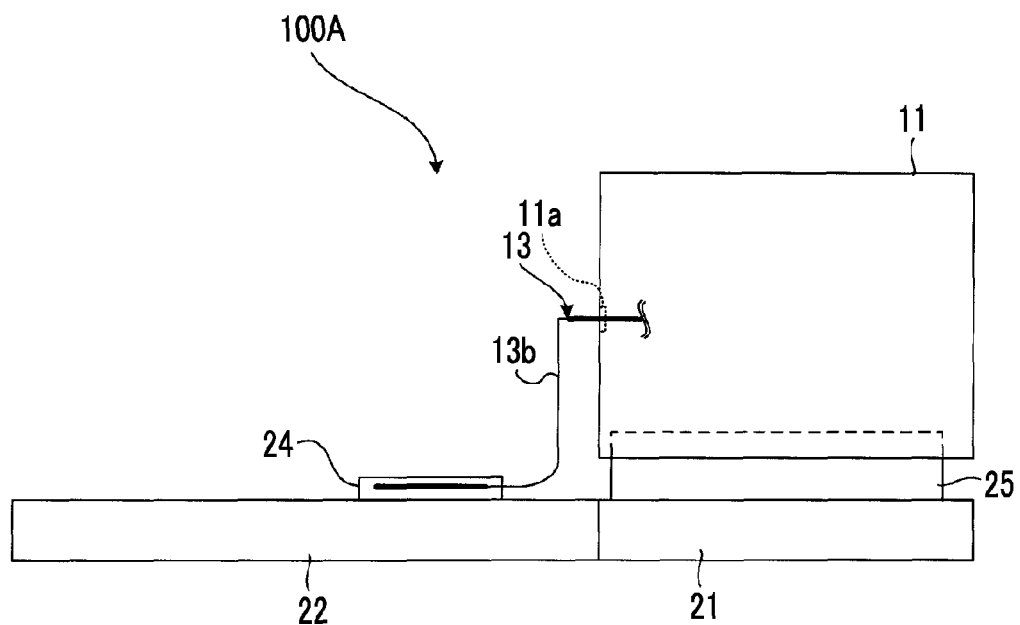
FIG. 11 is an external perspective view of an imaging module 100A which is a modification example of the imaging module 100 shown in FIG. 1.

In addition, in the imaging module 100, for example, as a modification example (imaging module 100A) shown in a side view of FIG. 11, preferably, a thickness of the portion (the portion indicated by a reference numeral 13*b* in FIG. 11) having a narrower width than that of the distal end portion of the portion of the flexible substrate 13 exposed from the housing 11 is thinner than a thickness of the distal end portion.

In this way, it is possible to further decrease the resistance of the flexible substrate 13 with respect to the bending. Since the thickness of the flexible substrate 13 decreases in the middle of the flexible substrate 13, a bending force is easily collected at the thin portion, and as a result, it is possible to easily perform inclination adjustment.

In addition, the entire portion of the wiring substrate for electrically connecting the lens drive unit 16 and the wiring connection portion 24 may not be the flexible substrate.

For example, in the wiring substrate, the portion inside the housing 11 may be a hard substrate, and only the portion exposed from the housing 11 may be a flexible substrate. In the wiring substrate, at least a portion including the end portion on the side connected to the wiring connection portion 24 may be configured of the flexible substrate, and if a portion having a narrow width or a portion having a thin thickness exists in the portion of the flexible substrate, effects such as the inclination adjustment being easily performed can be obtained.

In the example of FIG. 1, the flexible substrate 13 is extracted from the opening 11*a* of the housing 11 and is connected to the wiring connection portion 24 of the imaging element unit 20. However, the present invention is not limited to the configuration of FIG. 1 as long as the flexible substrate 13 can be connected to the wiring connection portion 24.

For example, the flexible substrate 13 is bent in the direction of the optical axis in the housing 11, and the flexible substrate 13 may be connected to the wiring connection portion 24 which is provided at a position overlapping with the lens unit 10 viewed from the subject side.

Figure 10:
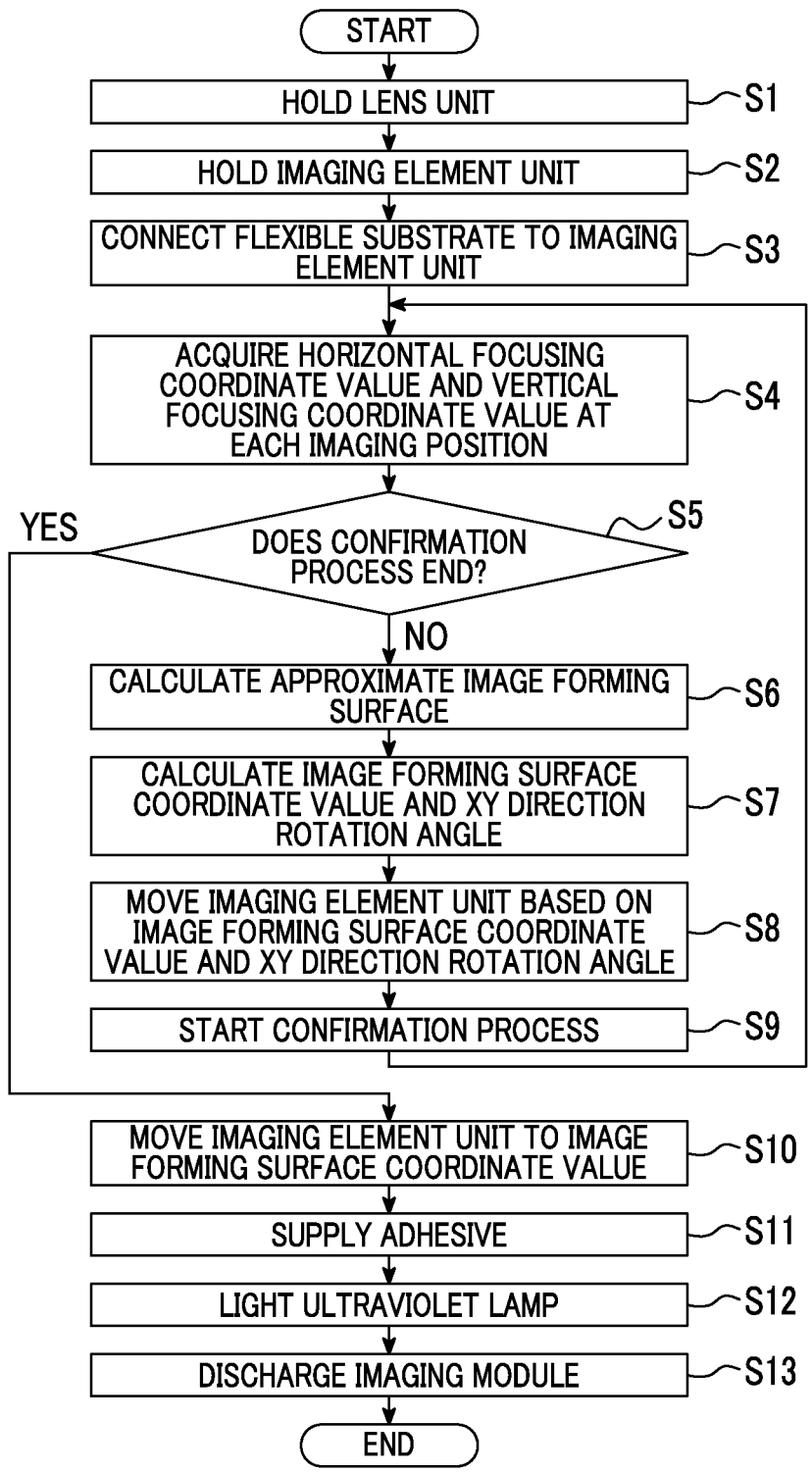
FIG. 10 is a flowchart for explaining a manufacturing process of the imaging module 100 performed by the imaging module manufacturing apparatus 200.

However, in this configuration, if the connection between the flexible substrate 13 and the wiring connection portion 24 being difficult, a spare space inside the housing 11 not existing, or the like is considered in the process of S3 of FIG. 10, the configuration of FIG. 1 is preferable.

Hereinafter, modification examples of the imaging module 100 will be described.

Figure 12:
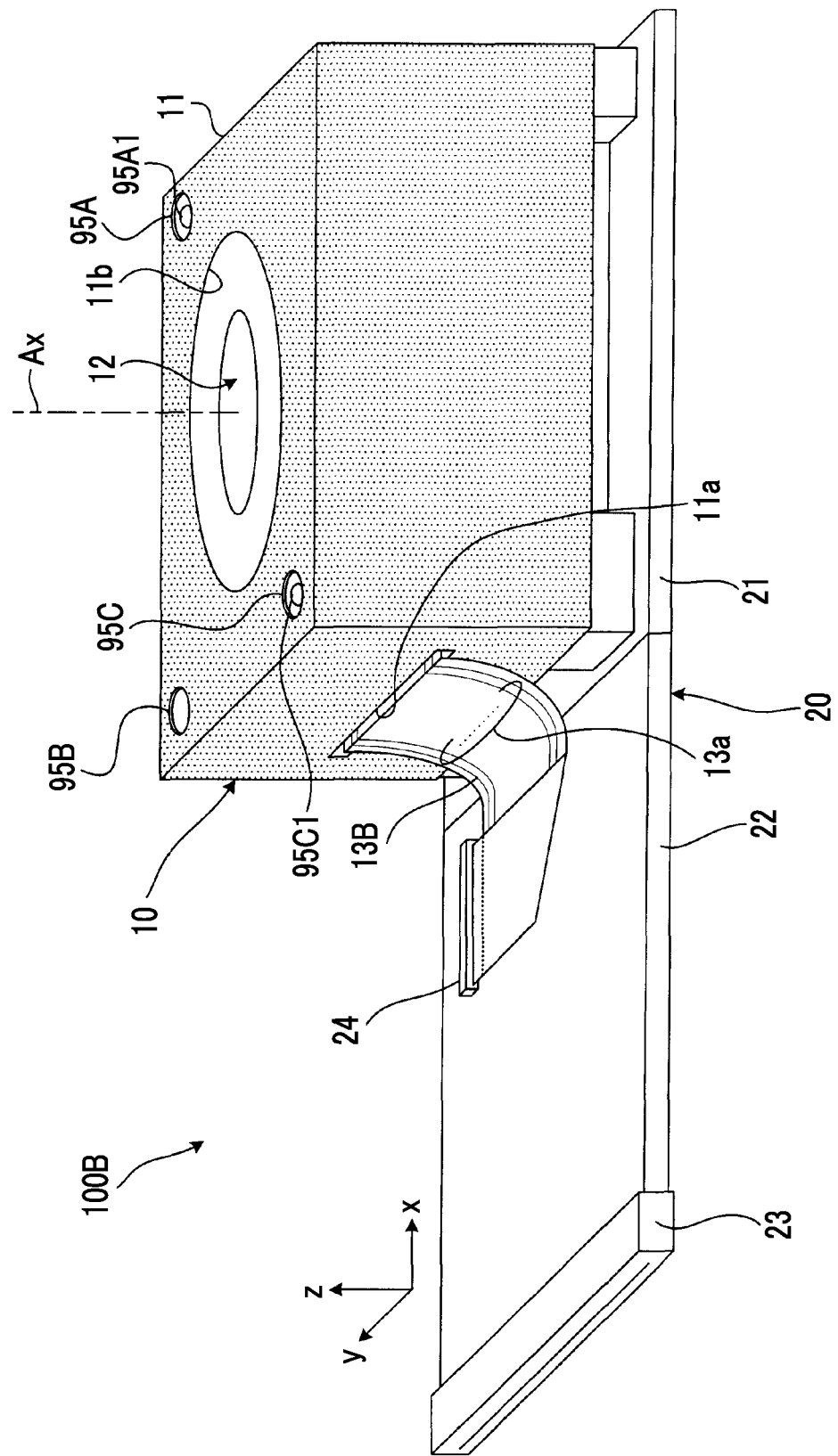
FIG. 12 is an external perspective view of an imaging module 100B which is a modification example of the imaging module 100 shown in FIG. 1.

FIG. 12 is an external perspective view of an imaging module 100B which is a modification example of the imaging module 100 shown in FIG. 1.

The imaging module 100B shown in FIG. 12 has the same configuration as that of the imaging module 100 except that the flexible substrate 13 is modified to a flexible substrate 13B.

The flexible substrate 13B is a wiring substrate which includes the above-described wiring group 13*a*. The flexible substrate 13B protrudes from the opening 11*a* of the housing 11 and is bent to the imaging element unit 20 side. In addition, the flexible substrate 13B is folded at the portion coming into contact with the flexible substrate 22 in a direction (an orthogonal direction in the example of FIG. 12) intersecting the direction in which each wire of the wiring group 13*a* extends. The distal end portion of the flexible substrate 13B is connected to the wiring connection portion 24. A difference between the flexible substrate 13B and the flexible substrate 13 is that the width in the arrangement direction of the wiring group 13*a* is constant in the flexible substrate 13B.

Figure 13B:
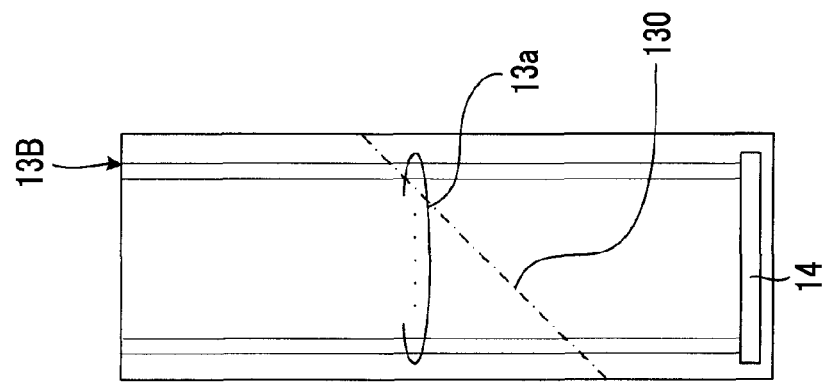
FIGS. 13A and 13B are plan views of the imaging module 100B shown in FIG. 12.
Figure 13A:
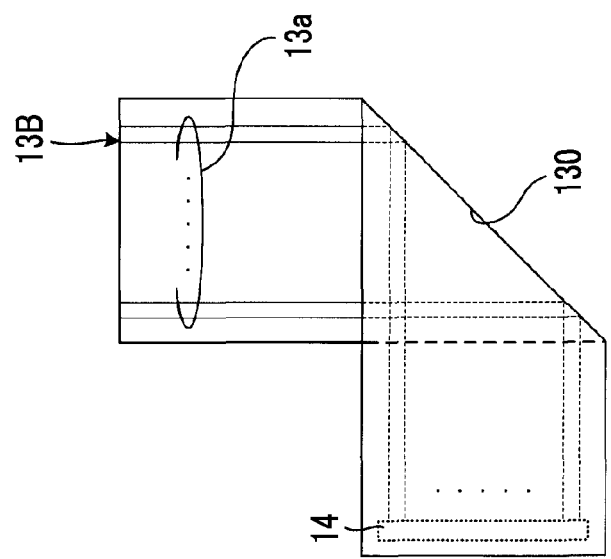

FIG. 13A is a view when the portion of the flexible substrate 13B exposed from the housing 11 shown in FIG. 12 is in a plan view in a direction perpendicular to an arbitrary plane in a state where the wiring group 13*a* included in the exposed portion is parallel with the arbitrary plane. FIG. 13B is a view in a state where the flexible substrate 13B of FIG. 13A is developed.

As shown in FIG. 13B, in the portion of the flexible substrate 13B exposed from the housing 11, the width in the arrangement direction of the wires of the wiring group 13*a* is constant, and in the middle of the exposed portion, the exposed portion is folded in a front direction of the paper surface at a folding portion 130, and the shape shown in FIG. 13A is formed.

In the flexible substrate 13B, since the distal end portion on the side on which the lens unit terminal portion 14 is positioned is fixed to the imaging element unit 20, and the proximal end portion on the opening 11a side of the housing 11 is fixed to the lens unit 10, a force is applied to a portion between the distal end portion and the proximal end portion when the imaging element unit 20 is inclined.

As shown in FIG. 13B, if the portion between the distal end portion and the proximal end portion is formed in a linear shape, when a force is applied in a direction intersecting the extension direction of the flexible substrate 13B, resistance increases.

Meanwhile, as shown in FIG. 13A, the portion between the distal end portion and the proximal end portion is formed in a nonlinear shape, when a force is applied in the right-left direction of the drawing, the force is easily distributed in the right-left direction due to the portion of the flexible substrate 13B extending in the right-left direction, and the resistance decreases.

In this way, even when the width and the thickness of the flexible substrate are constant, if the flexible substrate is formed in a nonlinear shape, it is possible to easily perform the inclination adjustment of the imaging element unit 20.

FIG. 14 is a view showing a modification example of the portion of the flexible substrate 13B exposed from the housing 11 shown in FIG. 12.

A flexible substrate 13C is formed so as to have a portion which is curved in the flexible substrate surface. Also in this shape, when a force is applied in the right-left direction of the drawing, the force is easily distributed in the right-left direction due to the portion of the flexible substrate 13C extending in the right-left direction, and the resistance decreases.

After a flexible substrate 13D protrudes from the housing 11 and linearly extends, the flexible substrate 13D is perpendicularly bent in the middle of the flexible substrate 13D, and is perpendicularly bent again. Also in this shape, when a force is applied in the right-left direction of the drawing, the force is easily distributed in the right-left direction due to the portion of the flexible substrate 13D extending in the right-left direction, and the resistance decreases.

Moreover, "the flexible substrate is being formed in a linear shape" means that a line which connects the distal end portion of the flexible substrate and the proximal end portion thereof at the shortest distance is substantially linear.

In this way, each of the flexible substrates 13B, 13C, and 13D has a shape (in other words, bent shape or curved shape) in which the arrangement direction of the wiring group 13a in a portion intersects the arrangement direction of the wiring group 13a of other portions except for the portion. In this way, since the flexible substrate is formed so as to be bent or curved although the width of the flexible substrate is constant, there is a room in the movement of the flexible substrate, and it is possible to decrease resistance during positioning.

In the flexible substrates 13B, 13C, and 13D, a portion having a narrower width than that of the distal end portion shown in FIG. 1 may be provided, or a portion having a thinner thickness than that of the distal end portion shown in FIG. 11 may be provided. For example, in the flexible substrate 13C shown in FIG. 14, the width of the curved portion is narrower than the widths of other portions. Moreover, in the flexible substrate 13D shown in FIG. 14, the width of the bent portion is narrower than the widths of other portions. According to this configuration, it is possible to further decrease the resistance with respect to the bending, and the inclination adjustment of the imaging element unit 20 is more easily performed.

As described above, the present specification describes the following matters.

A disclosed imaging module includes: a lens unit which has a lens group; and an imaging element unit which is fixed to the lens unit and has an imaging element which images a subject through the lens group, in which the lens unit has a lens drive unit which includes a first lens driving unit which moves at least some of lenses of the lens group in a first direction along an optical axis of the lens group, and a second lens driving unit and a third lens driving unit which move at least some of the lenses of the lens group in a second direction and a third direction which are orthogonal to the optical axis of the lens group, respectively, and a wiring substrate which includes a wiring group electrically connected to the lens drive unit, the imaging element unit has a wiring connection portion which is electrically connected to the wiring group included in the wiring substrate, at least a portion of the wiring substrate which includes an end portion on a side connected to the wiring connection portion is configured of a flexible substrate, and when the wiring group is parallel with a plane, a shape of a portion of the flexible substrate in a plan view from a direction perpendicular to the plane is a bent shape or a curved shape.

In the disclosed imaging module, an arrangement direction of the wiring group on an end portion of the flexible substrate on the lens unit side intersects an arrangement direction of the wiring group on an end portion of the flexible substrate on the wiring connection portion side.

In the disclosed imaging module, the flexible substrate is folded, in the middle of the flexible substrate, in a direction intersecting a direction in which the wiring group extends.

In the disclosed imaging module, the flexible substrate includes a portion of which a width in the arrangement direction of the wiring group of the flexible substrate is narrower than the width, in the arrangement direction of the wiring group, of the end portion on the side connected to the wiring connection portion.

In the disclosed imaging module, the flexible substrate in a plan view has a bent shape or a curved shape in the portion having the narrower width.

In the disclosed imaging module, the lens unit further has a housing in which the lens drive unit and a portion of the wiring substrate are accommodated, at least a portion of the wiring substrate which is exposed from the housing is configured of the flexible substrate, and the width of an end portion of the portion of the flexible substrate, which is exposed from the housing, on a side opposite to the side connected to the wiring connection portion is wider than the portion having the narrower width.

In the disclosed imaging module, the flexible substrate has a portion which is thinner than a thickness of the end portion of the flexible substrate on the side connected to the wiring connection portion.

In the disclosed imaging module, a pixel pitch of the imaging element is 1 μm or less.

A disclosed electronic device comprises the imaging module.

A disclosed manufacturing method of an imaging module is a manufacturing method of the imaging module, and the manufacturing method comprises: a first process of, on an axis orthogonal to a measurement chart, changing relative positions of the imaging element unit, the lens unit, and the measurement chart in the direction of the axis, and imaging the measurement chart by the imaging element at each relative position; and a second process of adjusting at least an inclination of the imaging element unit with respect to the lens unit based on imaging signals obtained by imaging the measurement chart using the imaging element, and fixing the imaging element unit to the lens unit, in which in the first process, the measurement chart is imaged by the imaging element at each relative position in a state where the wiring group of the wiring substrate is electrically connected to the wiring connection portion and electricity flows to the lens drive unit via the wiring connection portion.

INDUSTRIAL APPLICABILITY

An imaging module of the present invention is applied to an electronic device including a portable terminal having an imaging function such as a smart phone, high convenience is achieved, and the present invention is effectively applied.

Hereinbefore, the present invention is described according to specific embodiments. However, the present invention is not limited to the embodiments, and various modifications may be applied within a scope which does not depart from a technical idea of the disclosed invention.

What is claimed is:

1. An imaging module, comprising:
   a lens unit which has a lens group; and an imaging element unit which is fixed to the lens unit and has an imaging element which images a subject through the lens group,
   wherein the lens unit has a lens drive unit which includes a first lens driving unit which moves at least some of lenses of the lens group in a first direction along an optical axis of the lens group, and a second lens driving unit and a third lens driving unit which move at least some of the lenses of the lens group in a second direction and a third direction which are orthogonal to the optical axis of the lens group, respectively, and a wiring substrate which includes a wiring group electrically connected to the lens drive unit,
   wherein the imaging element unit has a wiring connection portion which is electrically connected to the wiring group included in the wiring substrate,
   wherein at least a portion of the wiring substrate which includes an end portion on a side connected to the wiring connection portion is configured of a flexible substrate,
   wherein when the wiring group is parallel with a plane, a shape of a portion of the flexible substrate in a plan view from a direction perpendicular to the plane is a bent shape or a curved shape, and
   wherein an arrangement direction of the wiring group on an end portion of the flexible substrate on the lens unit side intersects an arrangement direction of the wiring group on an end portion of the flexible substrate on the wiring connection portion side.

2. The imaging module according to claim 1,
   wherein the flexible substrate is folded, in the middle of the flexible substrate, in a direction intersecting a direction in which the wiring group extends.

3. The imaging module according to claim 1,
   wherein the flexible substrate includes a portion of which a width in the arrangement direction of the wiring group of the flexible substrate is narrower than the width, in the arrangement direction of the wiring group, of the end portion on the side connected to the wiring connection portion.

4. The imaging module according to claim 2,
   wherein the flexible substrate includes a portion of which a width in the arrangement direction of the wiring group of the flexible substrate is narrower than the width, in the arrangement direction of the wiring group, of the end portion on the side connected to the wiring connection portion.

5. The imaging module according to claim 3,
   wherein the lens unit further has a housing in which the lens drive unit and a portion of the wiring substrate are accommodated,
   wherein at least a portion of the wiring substrate which is exposed from the housing is configured of the flexible substrate, and
   wherein the width of an end portion of the portion of the flexible substrate, which is exposed from the housing, on a side opposite to the side connected to the wiring connection portion is wider than the portion having the narrower width.

6. The imaging module according to claim 4,
   wherein the lens unit further has a housing in which the lens drive unit and a portion of the wiring substrate are accommodated,
   wherein at least a portion of the wiring substrate which is exposed from the housing is configured of the flexible substrate, and
   wherein the width of an end portion of the portion of the flexible substrate, which is exposed from the housing, on a side opposite to the side connected to the wiring connection portion is wider than the portion having the narrower width.

7. The imaging module according to claim 3,
   wherein the flexible substrate in a plan view has a bent shape or a curved shape in the portion having the narrower width.

8. The imaging module according to claim 4,
   wherein the flexible substrate in a plan view has a bent shape or a curved shape in the portion having the narrower width.

9. The imaging module according to claim 1,
   wherein the flexible substrate has a portion which is thinner than a thickness of the end portion of the flexible substrate on the side connected to the wiring connection portion.

10. The imaging module according to claim 2,
    wherein the flexible substrate has a portion which is thinner than a thickness of the end portion of the flexible substrate on the side connected to the wiring connection portion.

11. The imaging module according to claim 1,
    wherein a pixel pitch of the imaging element is 1 µm or less.

12. The imaging module according to claim 2,
    wherein a pixel pitch of the imaging element is 1 µm or less.

13. An electronic device comprising the imaging module according to claim 1.

14. A manufacturing method of the imaging module according to claim 1, the method comprising:
    a first process of, on an axis orthogonal to a measurement chart, changing relative positions of the imaging element unit, the lens unit, and the measurement chart in the direction of the axis, and imaging the measurement chart by the imaging element at each relative position; and
    a second process of adjusting at least an inclination of the imaging element unit with respect to the lens unit based on imaging signals obtained by imaging the measurement chart by the imaging element, and fixing the imaging element unit to the lens unit,
wherein in the first process, the measurement chart is imaged by the imaging element at each relative position in a state where the wiring group of the wiring substrate is electrically connected to the wiring connection portion and electricity flows to the lens drive unit via the wiring connection portion.

* * * * *